US009610946B2

(12) United States Patent
Nishimura et al.

(10) Patent No.: US 9,610,946 B2
(45) Date of Patent: Apr. 4, 2017

(54) VEHICLE TRAVEL ASSISTANCE APPARATUS AND VEHICLE TRAVEL ASSISTANCE METHOD

(71) Applicant: Panasonic Intellectual Property Management Co., Ltd., Osaka (JP)

(72) Inventors: Hirofumi Nishimura, Kanagawa (JP); Asako Hamada, Kanagawa (JP); Maiko Shikatani, Kanagawa (JP); Takaaki Kishigami, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/878,244

(22) Filed: Oct. 8, 2015

(65) Prior Publication Data

US 2016/0152235 A1 Jun. 2, 2016

(30) Foreign Application Priority Data

Nov. 28, 2014 (JP) ................................. 2014-241743

(51) Int. Cl.
| | | |
|---|---|---|
| *B60W 30/08* | (2012.01) | |
| *B60W 30/09* | (2012.01) | |
| *G01S 13/93* | (2006.01) | |
| *G01S 7/41* | (2006.01) | |
| *G01S 13/72* | (2006.01) | |

(52) U.S. Cl.
CPC ............ *B60W 30/09* (2013.01); *G01S 7/411* (2013.01); *G01S 13/726* (2013.01); *G01S 13/931* (2013.01); *B60W 2550/10* (2013.01); *G01S 7/415* (2013.01); *G01S 2013/9353* (2013.01)

(58) Field of Classification Search
None
See application file for complete search history.

(56) References Cited

U.S. PATENT DOCUMENTS

| | | | | |
|---|---|---|---|---|
| 5,745,870 | A * | 4/1998 | Yamamoto | G01S 13/931 340/435 |
| 5,959,572 | A * | 9/1999 | Higashimata | B60K 31/0008 340/903 |
| 6,018,308 | A * | 1/2000 | Shirai | G01S 7/412 342/118 |
| 6,282,483 | B1 * | 8/2001 | Yano | B60K 31/0008 340/435 |
| 6,496,770 | B2 * | 12/2002 | Winner | B60K 31/0008 180/167 |
| 6,687,577 | B2 * | 2/2004 | Strumolo | G08G 1/166 342/70 |

(Continued)

FOREIGN PATENT DOCUMENTS

JP 2008-007062 1/2008

*Primary Examiner* — Jonathan M Dager
(74) *Attorney, Agent, or Firm* — Seed IP Law Group LLP

(57) ABSTRACT

A vehicle travel assistance apparatus includes
a transceiver that transmits radio waves and receives reflected waves,
a detector that detects a forward vehicle traveling ahead of a vehicle and a pedestrian based on intensities of the reflected waves, and
a controller that, in a case the detector detects a stop state of the forward vehicle,
a stop state of the vehicle and a presence of the pedestrian during the forward vehicle following, continues a stationary state of the vehicle.

5 Claims, 3 Drawing Sheets

(56) References Cited

U.S. PATENT DOCUMENTS

| | | | | |
|---|---|---|---|---|
| 7,224,290 B2* | 5/2007 | Takenaga | B60W 30/16 | 340/901 |
| 7,498,972 B2* | 3/2009 | Tanaka | G01S 17/936 | 342/104 |
| 7,598,848 B2* | 10/2009 | Takagi | G06K 9/00369 | 180/275 |
| 7,623,681 B2* | 11/2009 | Miyahara | G01C 3/08 | 382/104 |
| 7,664,589 B2* | 2/2010 | Etori | B60W 30/17 | 180/170 |
| 8,290,698 B2* | 10/2012 | Sawamoto | B60K 31/0008 | 340/435 |
| 8,799,201 B2* | 8/2014 | James | G06N 7/005 | 706/45 |
| 8,818,703 B2* | 8/2014 | Harada | B60R 21/0134 | 342/173 |
| 9,099,006 B2* | 8/2015 | Mudalige | B60W 10/00 | |
| 2003/0135318 A1* | 7/2003 | Tellis | B60K 31/0008 | 701/96 |
| 2003/0158666 A1* | 8/2003 | Koike | G01S 13/931 | 701/301 |
| 2003/0218564 A1* | 11/2003 | Tamatsu | G01S 7/414 | 342/70 |
| 2004/0010362 A1* | 1/2004 | Michi | B60K 31/0008 | 701/93 |
| 2004/0016870 A1* | 1/2004 | Pawlicki | H04N 5/247 | 250/208.1 |
| 2004/0064241 A1* | 4/2004 | Sekiguchi | B60K 31/0008 | 701/96 |
| 2005/0216169 A1* | 9/2005 | Arai | B60K 31/0008 | 701/96 |
| 2006/0001566 A1* | 1/2006 | Maass | G01S 7/295 | 342/70 |
| 2006/0055588 A1* | 3/2006 | Yoneda | G01S 7/4021 | 342/70 |
| 2006/0100769 A1* | 5/2006 | Arai | B60W 30/16 | 701/96 |
| 2006/0217866 A1* | 9/2006 | Moebus | B60K 31/0008 | 701/70 |
| 2007/0030132 A1* | 2/2007 | Kobayashi | B60W 50/16 | 340/436 |
| 2009/0201192 A1* | 8/2009 | Tokoro | B60R 21/0134 | 342/70 |
| 2009/0251355 A1* | 10/2009 | Nanami | G01S 13/931 | 342/27 |
| 2009/0299598 A1* | 12/2009 | Boecker | B60W 30/16 | 701/96 |
| 2011/0153178 A1* | 6/2011 | Westendorf | B60W 30/16 | 701/96 |
| 2011/0175767 A1* | 7/2011 | Tsunekawa | G01S 13/42 | 342/107 |
| 2012/0008129 A1* | 1/2012 | Lu | G01S 7/4802 | 356/5.01 |
| 2012/0053755 A1* | 3/2012 | Takagi | B60W 40/04 | 701/1 |
| 2012/0293357 A1* | 11/2012 | Nishigaki | G01S 17/023 | 342/52 |
| 2013/0207834 A1* | 8/2013 | Mizutani | G01S 7/411 | 342/70 |
| 2013/0222176 A1* | 8/2013 | Ishimori | G01S 13/345 | 342/70 |
| 2013/0226408 A1* | 8/2013 | Fung | B60W 40/09 | 701/41 |
| 2014/0022111 A1* | 1/2014 | Kuehnle | G01S 13/584 | 342/109 |
| 2014/0152488 A1* | 6/2014 | Baba | G01S 13/931 | 342/70 |
| 2014/0333467 A1* | 11/2014 | Inomata | G01S 13/867 | 342/27 |
| 2015/0086079 A1* | 3/2015 | Murao | G06K 9/00791 | 382/104 |
| 2015/0166062 A1* | 6/2015 | Johnson | B60W 30/12 | 701/41 |
| 2015/0168546 A1* | 6/2015 | Nakagawa | G01S 7/282 | 342/21 |
| 2015/0175162 A1* | 6/2015 | Nakadori | G01S 7/41 | 701/96 |
| 2016/0009281 A1* | 1/2016 | Tokimasa | B60W 30/16 | 701/96 |
| 2016/0009282 A1* | 1/2016 | Tokimasa | B60W 30/16 | 701/96 |
| 2016/0009283 A1* | 1/2016 | Tokimasa | B60W 30/16 | 701/96 |
| 2016/0031371 A1* | 2/2016 | Kimata | B60R 1/00 | 348/148 |
| 2016/0272199 A1* | 9/2016 | Kawahara | B60W 30/16 | |

\* cited by examiner

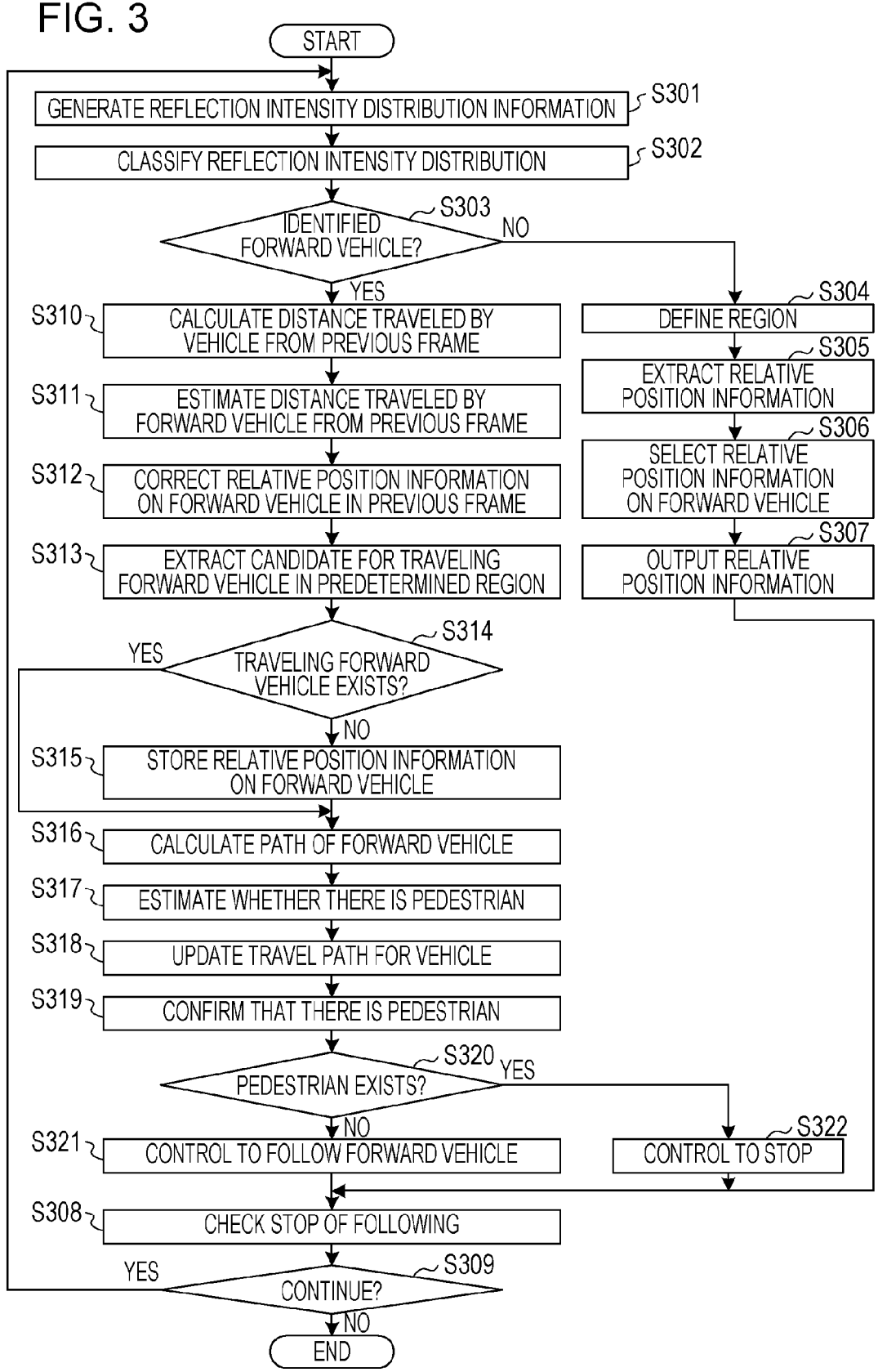

VEHICLE TRAVEL ASSISTANCE APPARATUS AND VEHICLE TRAVEL ASSISTANCE METHOD

BACKGROUND

1. Technical Field

The present disclosure relates to vehicle travel assistance apparatuses and vehicle travel assistance methods.

2. Description of the Related Art

A known vehicle travel assistance apparatus controls a vehicle so as to travel while following a forward vehicle. If stationary objects are included among candidate objects to be followed, such a vehicle travel assistance apparatus has difficulty in distinguishing between roadside objects, such as guardrails and fences, and a forward vehicle that is stationary because of traffic congestion or waiting for a traffic light to change, and thus has a problem of performing vehicle travel assistance. In contrast, if stationary objects are excluded from the candidate objects to be followed, such a vehicle travel assistance apparatus also excludes a forward vehicle that is stationary, which is a stationary object, from the selection as the object to be followed and it is thus difficult to stop the vehicle when the forward vehicle is stationary.

Japanese Unexamined Patent Application Publication No. 2008-7062 discloses a travel assistance apparatus that, when the distance between a stationary object and the vehicle is equal to or shorter than a threshold, the lateral displacement between the stationary object and the vehicle is equal to or less than a threshold, and the probability that the stationary object is in the lane of the vehicle is equal to or higher than a threshold, selects an object to be followed from such stationary objects.

SUMMARY

Unfortunately, according to Japanese Unexamined Patent Application Publication No. 2008-7062, if the travel assistance apparatus determines that a pedestrian is waiting for the forward vehicle to pass by, that is, a pedestrian is standing still at a crosswalk, as a roadside object, the vehicle does not stop but follows the forward vehicle.

One non-limiting and exemplary embodiment provides a vehicle travel assistance apparatus that can control the operation of following a forward vehicle in consideration of the movement of a pedestrian.

In one general aspect, the techniques disclosed here feature a vehicle travel assistance apparatus including: a transceiver that transmits radio waves and receives reflected waves; a detector that detects a forward vehicle traveling ahead of a vehicle and a pedestrian based on intensities of the reflected waves; and a controller that, in a case the detector detects a stop state of the forward vehicle, a stop state of the vehicle and a presence of the pedestrian during the forward vehicle following, continues a stationary state of the vehicle.

According to the present disclosure, it is possible to control the operation of following a forward vehicle in consideration of the movement of a pedestrian.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a flowchart of the operation of the vehicle travel assistance apparatus according to the embodiment of the present disclosure.

DETAILED DESCRIPTION

A vehicle travel assistance apparatus according to embodiments of the present disclosure will now be described with reference to the attached drawings.

<Configuration of a Vehicle Travel Assistance Apparatus>

Figure 1:
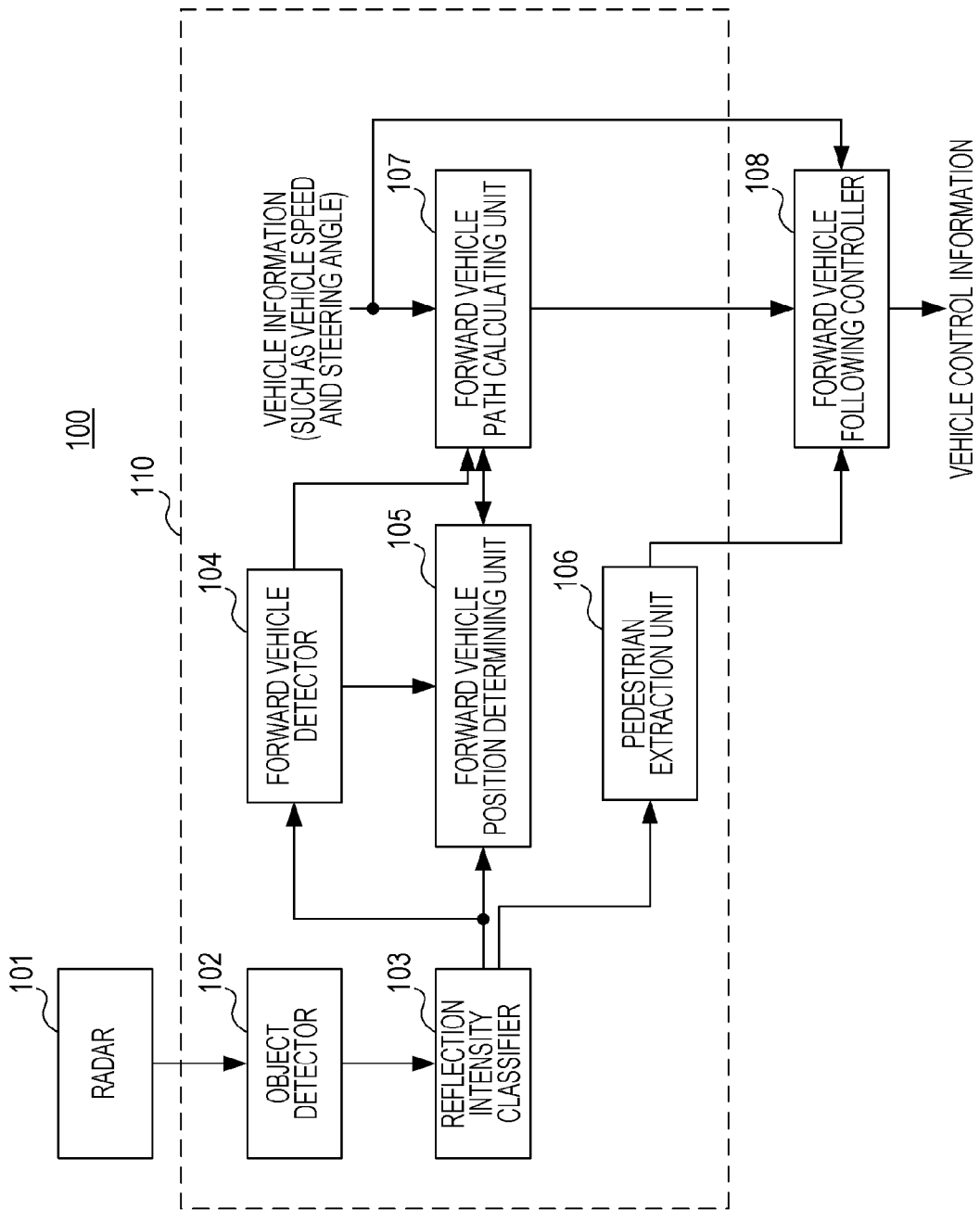
FIG. 1 is a block diagram illustrating the configuration of a vehicle travel assistance apparatus according to an embodiment of the present disclosure.

The configuration of a vehicle travel assistance apparatus 100 according to embodiments of the present disclosure will now be described with reference to FIG. 1 and FIG. 2.

The vehicle travel assistance apparatus 100 includes a radar 101 as a transceiver, an object detector 102, a reflection intensity classifier 103, a forward vehicle detector 104, a forward vehicle position determining unit 105, a pedestrian extraction unit 106, a forward vehicle path calculating unit 107, and a forward vehicle following controller 108 as a controller. The object detector 102 to the forward vehicle path calculating unit 107 form a detector 110.

The radar 101 transmits radio waves and receives reflected waves. The radio waves transmitted by the radar 101 are reflected by objects, such as the forward vehicle, roadside objects, and pedestrians, and received as reflected waves by the radar 101.

The object detector 102 determines the intensity of the reflected waves received by the radar 101. First, the object detector 102 determines the distance between each object reflecting the radio waves and the vehicle, from a timing difference between the transmission timing at which the radar 101 transmits the radio waves and the reception timing at which the radar 101 receives the reflected waves. The object detector 102 uses multiple antennas to receive the reflected waves to determine the direction the reflected waves come from, on the basis of a difference in the phase of the reflected waves between the antennas. The object detector 102 obtains a reflection intensity map containing a distance axis and a direction axis, from the intensity of the reflected waves. Then, the object detector 102 refers to the obtained reflection intensity map containing the distance axis and the direction axis to extract reflected waves having a certain reflection intensity equal to or higher than a noise level, and thus determines a relative position (relative position information) of the object reflecting the radio waves and identifies a region where the object exists.

The object detector 102 determines the distribution of the intensity of the reflected waves from the intensities of the reflected waves and the object region and outputs the distribution as reflection intensity distribution information to the reflection intensity classifier 103.

Figure 2:
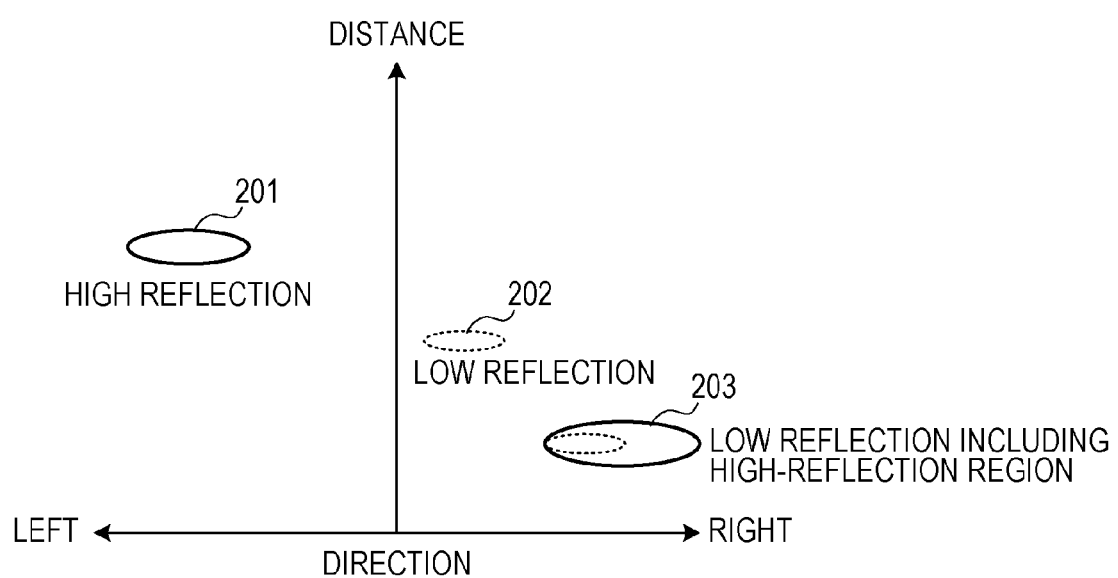
FIG. 2 illustrates a reflection intensity distribution according to the embodiment of the present disclosure.

With reference to FIG. 2, the reflection intensity distribution information indicates a correlation between each object region identified by a relative position determined from the direction and distance of the object region with respect to the vehicle and the intensity of the waves reflected by the object region and also contains the relative position information.

The object detector 102 determines a Doppler velocity from the reflected waves received by the radar 101 for each object region and outputs the velocity as Doppler velocity information to the reflection intensity classifier 103. The Doppler velocity information is associated with the reflection intensity distribution information for each object.

The reflection intensity classifier 103 compares the intensity of the reflected waves in each object region with a threshold determined in consideration of attenuation due to distance on the basis of the reflection intensity distribution information input from the object detector 102. The reflection intensity classifier 103 then classifies an entire region into an object region in which the intensities of the reflected waves are equal to or higher than the threshold (hereinafter referred to as a "high-reflection region") and an object region in which the intensities of the reflected waves are lower than the threshold (hereinafter referred to as a "low-reflection region"). The reflection intensity classifier 103 outputs the Doppler velocity information together with the results of the classification of the objects to the forward vehicle position determining unit 105 or the pedestrian extraction unit 106.

For example, with reference to FIG. 2, the reflection intensity classifier 103 classifies the entire field of view into the high-reflection region 201 and the low-reflection regions 202 and 203. In FIG. 2, the low-reflection region 203 is a region where an object (high-reflection object) exists with a reflected wave intensity equal to or higher than the threshold, and part of the region is a region where an object (low-reflection object) exists with a reflected wave intensity lower than the threshold (partial low-reflection region). That is, the reflection intensity classifier 103 classifies the entire field of view into a region where a high-reflection object exists and other regions. In other words, the reflection intensity classifier 103 classifies the objects into objects which have reflection wave intensity equal to or higher than the threshold in the entire region and objects which have reflection wave intensity lower than the threshold in at least part of the region.

The reflection intensity classifier 103 outputs the relative position information indicating the relative position of the high-reflection region to the forward vehicle detector 104 if the forward vehicle is not identified in the previous frame or to the forward vehicle position determining unit 105 if the forward vehicle is identified in the previous frame. The reflection intensity classifier 103 outputs the intensities of the reflected waves in the low-reflection region and the relative position information thereon to the pedestrian extraction unit 106. The relative position information is included in the reflection intensity distribution information.

The forward vehicle detector 104 selects the object at the relative position closest to the vehicle on the basis of the relative position information input from the reflection intensity classifier 103, determines that the selected object is the forward vehicle, and outputs the relative position information on the selected object to the forward vehicle path calculating unit 107, which will be described later.

The forward vehicle position determining unit 105 selects, from among the high-reflection regions, the high-reflection region closest to the forward vehicle position estimated in the previous frame by the forward vehicle path calculating unit 107, which will be described later, and identifies the high-reflection region as the position of the forward vehicle.

When determining that the forward vehicle is stationary on the basis of the estimated forward vehicle position, the forward vehicle position determining unit 105 stores the stationary position of the forward vehicle on the basis of the distance traveled by the vehicle and a corrected forward vehicle position input from the forward vehicle path calculating unit 107, which will be described later.

The pedestrian extraction unit 106 compares the intensity of the reflected waves from each low-reflection region input from the reflection intensity classifier 103 with a predetermined threshold. If the intensity of the reflected waves is lower than the threshold, the pedestrian extraction unit 106 estimates that the object reflecting the radio waves is a pedestrian and outputs a signal indicating that there is a pedestrian to the forward vehicle following controller 108.

If the intensity of the reflected waves is equal to or higher than the threshold, the pedestrian extraction unit 106 estimates whether the object reflecting the radio waves is a combined object (a pedestrian candidate) formed of a high-reflection object and a pedestrian (that is, a low-reflection object). For example, if the intensity of the reflected waves is equal to or higher than the threshold, the pedestrian extraction unit 106 determines a difference between the maximum and minimum values of the variation in the intensity of the reflected waves. If the difference between the maximum and minimum values of the variation in the intensity of the reflected waves is equal to or larger than a predetermined value, the pedestrian extraction unit 106 estimates that the object reflecting the radio waves is a combined object formed of a high-reflection object and a pedestrian (a pedestrian candidate) so as to detect the object, and outputs a signal indicating that there is a pedestrian to the forward vehicle following controller 108. For example, when a pedestrian exists between the vehicle and the forward vehicle, the difference between the maximum and minimum values of the variation in the intensity of the reflected waves is equal to or larger than the predetermined value.

For example, with reference to FIG. 2, the pedestrian extraction unit 106 determines that the intensity of the reflected waves is lower than the threshold in the low-reflection region 202 and estimates that the object reflecting the radio waves is a pedestrian. In contrast, the pedestrian extraction unit 106 determines that the intensity of the reflected waves is equal to or higher than the threshold in the low-reflection region 203 and estimates that the object reflecting the radio waves is a combined object formed of a high-reflection object and a pedestrian (a pedestrian candidate).

In another example, if the low-reflection region 203 in FIG. 2 exists across multiple frames without any significant change in the direction and position thereof and if a variation in the power of the low-reflection region 203 is caused by a variation in the reflection intensity typical of pedestrians, the pedestrian extraction unit 106 may determine that the reflection by a pedestrian is combined with a high reflection.

The forward vehicle path calculating unit 107 calculates the travel path of the forward vehicle on the basis of the relative position information input from the forward vehicle detector 104 and the forward vehicle position determining unit 105.

Specifically, if the forward vehicle detector 104 does not detect a forward vehicle, the forward vehicle position determining unit 105 stores the relative position of the forward vehicle identified in the previous frame as the position of the forward vehicle until the subsequent frame. In the subsequent frame, the forward vehicle position determining unit 105 outputs the relative position to the forward vehicle path calculating unit 107 in consideration of the movement of the vehicle and the estimated movement of the forward vehicle.

After identifying the position of the forward vehicle, the forward vehicle position determining unit 105 re-inputs the identified position to the forward vehicle path calculating unit 107. The forward vehicle path calculating unit 107 stores the identified position together with the position in the previous frame as the travel path. The forward vehicle path calculating unit 107 determines the distance traveled by the vehicle from vehicle speed information and steering angle information in retrieved vehicle information, corrects and updates the calculated travel path of the forward vehicle with the distance traveled by the vehicle, and outputs path information indicating the updated travel path to the forward vehicle following controller 108.

If the forward vehicle following controller 108 does not receive input of a signal indicating that there is a pedestrian, the forward vehicle following controller 108 regards the updated travel path as a travel path for the vehicle and outputs vehicle control information for traveling while following the forward vehicle. If the forward vehicle following controller 108 determines that the vehicle is stationary from the vehicle speed information in the vehicle information and receives input of a signal indicating that there is a pedestrian from the pedestrian extraction unit 106, the forward vehicle following controller 108 outputs vehicle control information for continuing the stationary state.

The vehicle control information is input to the control section of the engine control unit (ECU) (not shown) of the vehicle via a vehicle network, such as a controller area network (CAN). The control section controls, for example, the amount of depression of the accelerator and the operation of the brake while traveling in accordance with the vehicle control information.

<Operation of the Vehicle Travel Assistance Apparatus>

The operation of the vehicle travel assistance apparatus 100 according to embodiments of the present disclosure will now be described with reference to FIG. 3.

The vehicle travel assistance apparatus 100 is activated by, for example, operation of an external input section (not shown), such as a switch disposed on the steering wheel. Here, a description will be given of the case where the vehicle travel assistance apparatus 100 is activated by the driver operating the external input section while the vehicle and the forward vehicle are traveling. The vehicle travel assistance apparatus 100 may determine whether the vehicle is traveling on the basis of the vehicle information and may be automatically activated if the vehicle is traveling.

First, the object detector 102 determines the distribution of the intensity of the reflected waves in each frame on the basis of the reflected waves received by the radar 101 and generates the reflection intensity distribution information for each frame (S301).

The reflection intensity classifier 103 classifies the entire field of view into the high-reflection region and the low-reflection region on the basis of the reflection intensity distribution information (S302).

The forward vehicle detector 104 determines whether the forward vehicle has already been identified (S303).

If the forward vehicle has not been identified yet (S303: No), the forward vehicle detector 104 defines a region for identifying the forward vehicle (S304).

The forward vehicle detector 104 extracts the relative position information on the high-reflection region in the defined region (S305). Namely, the forward vehicle detector 104 extracts a high-reflection object (moving object) in the region.

The forward vehicle detector 104 selects the relative position information indicating the closest relative position as the relative position information on the forward vehicle from among the extracted relative position information (S306). Namely, the forward vehicle detector 104 identifies the high-reflection object that is closest to the vehicle and is moving in the same direction as the vehicle, as the forward vehicle.

The forward vehicle detector 104 outputs the selected relative position information to the forward vehicle position determining unit 105 (S307).

The vehicle travel assistance apparatus 100 checks whether the operation to stop the operation of following the forward vehicle has been performed on the external input section (S308). The vehicle travel assistance apparatus 100 may automatically stop following the forward vehicle after each frame.

The vehicle travel assistance apparatus 100 determines whether to continue following the forward vehicle on the basis of the result of the check in S308 (S309).

If the operation of following the forward vehicle is not continued (S309: No), the vehicle travel assistance apparatus 100 ends the processing.

If the operation of following the forward vehicle is continued (S309: Yes), the vehicle travel assistance apparatus 100 returns to S301 and starts the processing in the subsequent frame.

If the forward vehicle has already been identified by the forward vehicle detector 104 (S303: Yes), the forward vehicle position determining unit 105 calculates the distance traveled by the vehicle from the previous frame on the basis of the vehicle speed information and steering angle information in the vehicle information (S310).

The forward vehicle position determining unit 105 estimates the distance traveled by the forward vehicle from the previous frame on the basis of the Doppler velocity information input from the reflection intensity classifier 103 (S311).

The forward vehicle position determining unit 105 corrects the relative position information, input from the forward vehicle detector 104 in S307, on the forward vehicle in the previous frame on the basis of the distance traveled by the vehicle calculated in S310 and the distance traveled by the forward vehicle estimated in S311 (S312).

If the high-reflection region exists in, for example, a region estimated to be the destination of the forward vehicle in a predetermined region including the position indicated by the corrected relative position information on the forward vehicle in the current frame, the forward vehicle position determining unit 105 extracts the high-reflection region as a candidate for the traveling forward vehicle as a moving object (S313).

The forward vehicle position determining unit 105 determines whether the forward vehicle is traveling on the basis of the Doppler velocity information and the result of the detection in S313 (S314). Specifically, if a moving object is detected in the predetermined region, the forward vehicle position determining unit 105 determines that the forward vehicle is traveling. If no moving object is detected in the predetermined region, the forward vehicle position determining unit 105 determines that the forward vehicle is stationary.

If there is no traveling forward vehicle because the forward vehicle is stationary, that is, if the object in the high-reflection region is determined to be stationary on the basis of the Doppler velocity information (S314: No), the forward vehicle position determining unit 105 updates the relative position information on the forward vehicle in the current frame to the relative position information on the forward vehicle corrected in S312 and stores the updated relative position information (S315). The stored relative position information indicates the relative position of the forward vehicle waiting for a traffic light to change or stationary because of traffic congestion.

If the forward vehicle is traveling (S314: Yes), the forward vehicle position determining unit 105 skips S315, and the forward vehicle path calculating unit 107 executes S316.

Specifically, if the forward vehicle is traveling, the forward vehicle position determining unit 105 detects a moving object in the predetermined region to identify the position of the forward vehicle and updates the relative position information on the forward vehicle.

If the forward vehicle is stationary, the forward vehicle position determining unit 105 sequentially stores the relative position information on the forward vehicle. If the forward vehicle is stationary and the vehicle is traveling, the forward vehicle position determining unit 105 updates the relative position information on the stationary forward vehicle by correcting the relative position information on the forward vehicle in the previous frame on the basis of the distance traveled by the vehicle calculated in S310.

The forward vehicle position determining unit 105 detects a moving object again in a predetermined region indicated by the updated relative position information on the forward vehicle and thus determines that the state of the forward vehicle has changed from the stationary state to the traveling state.

The forward vehicle path calculating unit 107 calculates the travel path of the forward vehicle on the basis of the relative position information on the forward vehicle and the vehicle information (S316).

The pedestrian extraction unit 106 estimates whether there is a pedestrian and outputs a signal indicating that there is a pedestrian (S317).

The forward vehicle following controller 108 updates the travel path for the vehicle to the travel path of the forward vehicle calculated by the forward vehicle path calculating unit 107 (S318).

The forward vehicle following controller 108 confirms that there is a pedestrian candidate in accordance with the input of the signal indicating that there is a pedestrian from the pedestrian extraction unit 106 (S319).

The forward vehicle following controller 108 determines whether there is the pedestrian confirmed in S319 on or around the travel path for the vehicle updated in S318 (S320).

If the pedestrian is not on or around the travel path for the vehicle (S320: No), the forward vehicle following controller 108 outputs the vehicle control information for the vehicle to follow the forward vehicle (S321).

If the pedestrian is on or around the travel path for the vehicle (S320: Yes), the forward vehicle following controller 108 outputs the vehicle control information for the vehicle to stop or to continue the stationary state (S322).

After the forward vehicle following controller 108 executes S321 or S322, the vehicle travel assistance apparatus 100 executes S308.

If the vehicle is stationary and a pedestrian is detected, the vehicle travel assistance apparatus 100 continues the stationary state of the vehicle. If a pedestrian is detected and the forward vehicle is traveling, the vehicle travel assistance apparatus 100 stops following the forward vehicle and stops the vehicle.

For example, in traffic congestion, when the forward vehicle starts traveling while the vehicle is stationary, the presence of a pedestrian crossing the road between the vehicle and the forward vehicle enables the vehicle travel assistance apparatus 100 to put the operation of following the forward vehicle on hold. If the pedestrian is not present anymore, the vehicle travel assistance apparatus 100 starts the operation of following the forward vehicle. This puts the start of travel of the vehicle on hold independently of the movement of the forward vehicle while the pedestrian between the vehicle and the forward vehicle is crossing the road.

For example, when the vehicle is stationary at a crosswalk at an intersection or a straight road, the vehicle travel assistance apparatus 100 puts the operation of following the forward vehicle on hold even after the forward vehicle has started traveling. If the pedestrian is not present anymore, the vehicle travel assistance apparatus 100 starts the operation of following the forward vehicle. That is, the vehicle travel assistance apparatus 100 controls the traveling of the vehicle, providing priority to the crossing of the pedestrian over the operation of following the forward vehicle.

As described above, according to this embodiment, the vehicle travel assistance apparatus 100 controls the operation of following the forward vehicle in consideration of the movement of the pedestrian.

According to this embodiment, the vehicle travel assistance apparatus 100 continues identifying the position of the forward vehicle (the position relative to the vehicle) and sequentially stores the relative position information on the forward vehicle if the vehicle is stationary.

When the forward vehicle stops, the vehicle travel assistance apparatus 100 stores the relative position information on the forward vehicle and, after the forward vehicle starts traveling again, identifies a moving object detected in the region indicated by the stored relative position information as the forward vehicle. This allows the vehicle travel assistance apparatus 100 to continue following the forward vehicle independently of the traveling state (traveling or stationary) of the forward vehicle.

When the vehicle starts traveling after the stationary state, the vehicle travel assistance apparatus 100 controls the operation of following the forward vehicle with the travel path of the forward vehicle serving as the travel path for the vehicle. For example, even when the forward vehicle starts traveling while the vehicle is stationary, resulting in an increase in the distance between the vehicle and the forward vehicle, the vehicle travel assistance apparatus 100 can follow the forward vehicle.

For example, when the forward vehicle turns right or left at an intersection while the vehicle is stationary, resulting in the forward vehicle being out of the detection range of the radar, the forward vehicle following controller 108 sets the travel path of the vehicle to the travel path of the forward vehicle and thus restarts the operation of following the forward vehicle.

For example, the vehicle travel assistance apparatus 100 may control the operation of following the forward vehicle on the basis of the travel path of the forward vehicle after restarting the operation of following the forward vehicle and before detecting the forward vehicle and restart update of the relative position information on the forward vehicle and the travel path for the vehicle after detecting the forward vehicle again.

In the present disclosure, the type, arrangement, and number of components, for example, are not limited to the above-described embodiments, and the structural features may be appropriately replaced by those achieving an equivalent operation and effect or may be appropriately modified within the gist of the present disclosure.

For example, the relative position of the forward vehicle is determined in order to select a forward vehicle to be followed in the above-described embodiments; however, the forward vehicle having the highest intensity of the reflected waves may be selected and followed, instead of determining the relative position.

Various aspects of the embodiments of the present disclosure will now be described.

According to a first aspect, a vehicle travel assistance apparatus includes a transceiver that transmits radio waves and receives reflected waves, a detector that detects a forward vehicle traveling ahead of a vehicle and a pedestrian based on intensities of the reflected waves, and a controller that, in a case the detector detects a stop state of the forward vehicle, a stop state of the vehicle and a presence of the pedestrian during the forward vehicle following, continues a stationary state of the vehicle.

According to a second aspect, in the vehicle travel assistance apparatus according to the first aspect, the detector determines one or more relative positions a first object reflecting the radio waves based on the reflected waves, detects a first object at the first relative position closest to the vehicle as the forward vehicle among the one or more objects reflecting the radio waves the reflected waves of which have an intensity equal to or higher than a threshold, and detects a second object reflecting the radio waves the reflected waves of which have an intensity lower than the threshold as the pedestrian.

According to a third aspect, in the vehicle travel assistance apparatus according to the second aspect, the detector sequentially stores relative position information indicating the first relative position of the forward vehicle based on the reflected waves, and the controller determines the first relative position indicated by the stored relative position information as a position of the forward vehicle in a case the detector does not detect the presence of the pedestrian and then the vehicle starts traveling after being in the stationary state.

According to a fourth aspect, in the vehicle travel assistance apparatus according to the second aspect, the detector includes a calculator that calculates a travel path of the forward vehicle based on the first relative position of the forward vehicle and vehicle information relating to a traveling state of the vehicle, and the controller determines the travel path as a travel path for the vehicle in a case the vehicle starts traveling after being in the stationary state.

According to a fifth aspect, a vehicle travel assistance method includes transmitting radio waves and receiving reflected waves, detecting a forward vehicle traveling ahead of a vehicle and a pedestrian based on intensities of the reflected waves, and continuing, in a case of detecting a stop state of the forward vehicle, a stop sate of the vehicle and a presence of the pedestrian during the forward vehicle following, a stationary state of the vehicle.

Various embodiments have been described with reference to the drawings; however, it should be understood that the present disclosure is not limited to the examples described above. It will be apparent to those skilled in the art that various changes and modifications can be made within the scope of the appended claims, and it should be understood that all such changes and modifications are intended to be included within the technical scope of the present disclosure. Furthermore, structural features of the different embodiments may be combined in any suitable manner without departing from the spirit of the present disclosure.

The present disclosure is composed of hardware in the examples in the above-described embodiments but may also be composed of software in cooperation with hardware.

Each functional block in the description of the embodiments is implemented as an LSI, which is typically an integrated circuit including an input terminal and an output terminal. These functional blocks may be prepared as individual chips or may be prepared as one chip including part or all of the functional blocks. The term "LSI" is used here; however, it may be called as an IC, system LSI, super LSI, or ultra LSI depending on the degree of integration.

Circuit integration may be implemented by not only LSI but also a dedicated circuit or a general-purpose processor. It may also be implemented by a field programmable gate array (FPGA) capable of programming or a reconfigurable processor capable of reconfiguring the connection or setting of cells in LSI after the manufacture of the LSI.

Furthermore, if the advance of the semiconductor technology or other derived techniques results in the development of a circuit integration technique replacing LSI, such a technique may be, of course, used for the integration of the functional blocks. One possibility is the application of biotechnology.

The vehicle travel assistance apparatus and the vehicle travel assistance method according to the present disclosure are suitably used for assisting vehicle travel.

What is claimed is:

1. A vehicle travel assistance apparatus comprising:
    a transceiver that transmits radio waves and receives reflected radio waves;
    a detector that detects a forward vehicle traveling ahead of a vehicle and a pedestrian based on intensities of the reflected radio waves; and
    a controller that, in a case the vehicle is in a stop state and the detector detects the pedestrian during an operation of the vehicle following the forward vehicle, continues the stop state of the vehicle by interrupting the operation of the vehicle following the forward vehicle even after the forward vehicle starts travelling,
    wherein the controller, after interrupting the operation of the vehicle following the forward vehicle, resumes the operation of the vehicle following the forward vehicle after the detector does not detect the pedestrian.

2. The vehicle travel assistance apparatus according to claim 1, wherein
    the detector determines one or more relative positions of one or more objects reflecting the transmitted radio waves based on the reflected radio waves, detects a first object at a first relative position closest to the vehicle as the forward vehicle among the one or more objects reflecting the transmitted radio waves, the reflected radio waves of which have an intensity equal to or higher than a threshold, and detects a second object reflecting the transmitted radio waves as a pedestrian, the reflected waves of which have an intensity lower than the threshold.

3. The vehicle travel assistance apparatus according to claim 2, wherein
    the detector sequentially stores relative position information indicating the first relative position of the forward vehicle based on the reflected radio waves; and
    the controller determines the first relative position indicated by the stored relative position information as a position of the forward vehicle in a case the detector does not detect the presence of the pedestrian and then the vehicle starts traveling after being in the stop state.

4. The vehicle travel assistance apparatus according to claim 2, wherein
the detector includes a calculator that calculates a travel path of the forward vehicle based on the first relative position of the forward vehicle and vehicle information relating to a traveling state of the vehicle; and
the controller determines the travel path as a travel path for the vehicle in a case the vehicle starts traveling after being in the stop state.

5. A vehicle travel assistance method comprising:
transmitting radio waves and receiving reflected radio waves;
detecting a forward vehicle traveling ahead of a vehicle and a pedestrian based on intensities of the reflected radio waves;
continuing, in a case the vehicle is in a stop state and the pedestrian is detected during an operation of the vehicle following the forward vehicle, the stop state of the vehicle by interrupting the operation of the vehicle following the forward vehicle even after the forward vehicle starts travelling; and
resuming, after interrupting the operation of the vehicle following the forward vehicle, the operation of the vehicle following the forward vehicle after the pedestrian is not detected.

* * * * *